United States Patent
Schellekens et al.

(10) Patent No.: US 11,174,383 B2
(45) Date of Patent: Nov. 16, 2021

(54) METHOD FOR PREPARING COMPOSITION SUITABLE FOR ELECTROSTATIC PAINTING

(71) Applicant: DSM IP ASSETS B.V., Heerlen (NL)

(72) Inventors: Ronald Michaël Alexander Maria Schellekens, Echt (NL); Michelle Elizabeth Seitz, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 148 days.

(21) Appl. No.: 16/484,505

(22) PCT Filed: Feb. 8, 2018

(86) PCT No.: PCT/EP2018/053221
§ 371 (c)(1),
(2) Date: Aug. 8, 2019

(87) PCT Pub. No.: WO2018/146223
PCT Pub. Date: Aug. 16, 2018

(65) Prior Publication Data
US 2020/0190316 A1 Jun. 18, 2020

(30) Foreign Application Priority Data
Feb. 13, 2017 (EP) ...................... 17155832

(51) Int. Cl.
| | | |
|---|---|---|
| *C08L 67/02* | (2006.01) | |
| *B05D 1/04* | (2006.01) | |
| *B05D 1/18* | (2006.01) | |
| *B05D 7/02* | (2006.01) | |
| *H01B 1/24* | (2006.01) | |

(52) U.S. Cl.
CPC .............. *C08L 67/02* (2013.01); *B05D 1/04* (2013.01); *B05D 1/18* (2013.01); *B05D 7/02* (2013.01); *H01B 1/24* (2013.01); *C08L 2203/20* (2013.01); *C08L 2205/025* (2013.01)

(58) Field of Classification Search
CPC ....... C08L 67/02; C08L 67/00; C08L 2203/20
See application file for complete search history.

(56) References Cited

U.S. PATENT DOCUMENTS

| | | | |
|---|---|---|---|
| 5,004,561 A | 4/1991 | Nomura et al. | |
| 2002/0183438 A1 | 12/2002 | Amarasekera et al. | |
| 2005/0186438 A1* | 8/2005 | Alms | ............... C08L 67/02 428/480 |
| 2012/0196965 A1* | 8/2012 | Konduri | ................. C23C 14/20 524/315 |

FOREIGN PATENT DOCUMENTS

| | | |
|---|---|---|
| CN | 102617997 B * | 8/2014 |
| EP | 0 908 490 | 4/1999 |
| EP | 2 084 228 | 9/2011 |
| FR | 2 596 403 | 10/1987 |
| JP | 2009-102581 | 5/2009 |
| WO | 2005/030870 | 4/2005 |
| WO | 2015/031573 | 3/2015 |

OTHER PUBLICATIONS

CN102617997, machine translation (Year: 2012).*
CN102617997B, machine translation, 2014 (Year: 2014).*
International Search Report and Written Opinion for PCT/EP2018/053221, dated Apr. 19, 2018, 13 pages.

* cited by examiner

*Primary Examiner* — Robert A Vetere
(74) *Attorney, Agent, or Firm* — Nixon & Vanderhye P.C.

(57) ABSTRACT

This invention relates to a method for preparing a composition having a melt viscosity of between 160 Pas and 400 Pas, as determined according to ISO-11443-2014 at 270° C. and a shear rate of 265 l/s, and a volume resistivity of at most $10^5$ Ohm·cm, measured according to ASTM D257 on an injection molded test sample of 3 mm thickness and a diameter of 50 mm and coated with a gold layer on an upper and lower surface and, as well as the composition itself and painted parts comprising the composition.

7 Claims, No Drawings

METHOD FOR PREPARING COMPOSITION SUITABLE FOR ELECTROSTATIC PAINTING

This application is the U.S. national phase of International Application No. PCT/EP2018/053221 filed 8 Feb. 2018, which designated the U.S. and claims priority to EP Patent Application No. 17155832.3 filed 13 Feb. 2017, the entire contents of each of which are hereby incorporated by reference.

This invention relates to a method for preparing a composition which is suitable for electrostatic painting, comprising polybutylene terephthalate and polyethylene terephthalate as well as the composition itself and parts thereof. Compositions comprising polybutylene terephthalate (PBT) and polyethylene terephthalate (PET) are known and are for example described in EP2084228B1. This patent describes a composition comprising PBT, PET and a talc filler. A disadvantage of these kind of compositions, however, is that they cannot be electrostatically painted. Electrostatic painting is a process in which paint is projected towards a electrically conductive piece by for example spraying method, and subsequently the paint is bonded to the piece. Plastics can be made electrically conductive by adding an electrically conductive additive such as metals, electrically conductive carbon black, carbon fibers and carbon nanotubes. A disadvantage of this is that the adhesion of the paint after painting may still not be sufficient.

It is thus an object of the present invention to provide a method for preparing a composition which can be electrostatically painted, while exhibiting good adhesion to the paint. This object has been achieved by a method for preparing a composition having a melt viscosity of between 160 Pas and 400 Pas, as determined according to ISO-11443-2014 at 270° C. and a shear rate of 265 1/s, and a volume resistivity of at most $10^5$ Ohm·cm, as measured according to ASTM D257 on an injection molded test sample of 3 mm thickness and a diameter of 50 mm and coated with a gold layer on an upper and lower surface, comprising the following steps:

Providing polybutylene terephthalate (PBT) having a relative solution viscosity (RSV) of between 1.6 and 2.4 as measured at 25° C. in meta-cresol according to ISO 1628-5, in an amount of between 40 and 70 wt % with respect to the total weight of the composition;

Providing polyethylene terephthalate (PET) having a relative solution viscosity (RSV) of between 1.1 and 1.5 as measured at 25° C. in dichloro acetic acid according to ISO 1628-5, in an amount of between 10 and 40 wt % with respect to the total weight of the composition;

Providing filler in an amount of between 10 and 30 wt % wherein the filler is chosen from the group consisting of glass fibers, talc, mica, wollastonite, glass beads and milled glass and combinations thereof, wt % being with respect to the total weight of the composition;

Providing an electrically conductive additive in an amount between 2 and 10 wt % with respect to the total weight of the composition, wherein the electrically conductive additive is chosen from the group consisting of carbon black, carbon fibers, graphite, carbon nanotubes, and graphene and combinations thereof and wherein the electrically conductive additive exhibits a volume resistivity of at most $10^5$ Ohm·cm, as measured according to ASTM D257 on an injection molded test sample of 3 mm thickness and a diameter of 50 mm, consisting of 8 wt % of electrically conductive additive and 92 wt % of PBT having a relative solution viscosity of 2.0 in meta cresol, wherein the wt % is with respect to the total weight of the injection molded test sample, which injection molded test sample was coated with a gold layer on an upper and lower surface;

Mixing at least the PBT, PET, filler and electrically conductive additive at a temperature of between 240 and 260° C. in order to obtain the composition.

Surprisingly, the inventors have found the method according to the invention results in a composition that can be electrostatically painted while exhibiting a good adhesion to the paint. This has been exemplified by examples.

Melt Viscosity

The method according to the invention is to prepare a composition having a melt viscosity of between 160 and 400 Pas, the melt viscosity being an intrinsic property of a composition and can be measured by capillary rheometer as described in ISO-11443-2014. As melt viscosity determination is known to be sensitive to experimental conditions, the following protocol consistent with ISO-11443-2014 A2-type test (capillary die with specified volume flow rate) is used. Experiments may be performed with a Gottfert Rheograph 120 with oven diameter 12 mm, and a capillary of length 30 mm, diameter 1 mm, a ratio of length to diameter of 30/1 and entrance angle 180° (flat). The pressure transducer is a CAN-bus with maximum 2000 bar. The filling time is 45 to 60 seconds, the melting time 300 s, and the piston speed changed from low to high speed in the following steps: 0.02, 0.05, 0.1, 0.2, 0.5, 1, 2, 5 and 10 mm/s. The measuring temperature was 270° C. Data point, take over: 1% tolerance, comparison time 10 seconds. The volume flow rate, Q, is calculated to be equal to the piston velocity in mm/s multiplied by the area of the piston in square mm. The shear rate is calculated according to ISO-11443-2014 section 8.5 equation 12. No Bagley correction is applied and the shear stress is calculated according to ISO-11443-2014 section 8.3.2 equation 5. The ratio of the shear stress and shear rate as previously defined is the melt viscosity according to ISO-11443-2014 section 3.10. The results are reported as melt viscosity at a specific piston velocity, and the extrapolated melt viscosity at a shear rate of 265 1/s.

For polyester materials, it is important to ensure that the sample does not contain more than 0.01 wt % of water with respect to the total weight of polyester before doing the capillary measurement or else the results will be inconsistent. The water content can be determined via Karl Fischer titration. Materials can be dried at 95° C. under vacuum until the moisture level is at most 0.01 wt % of water with respect to the total weight of polyester.

The melt viscosity depends amongst others on the relative solution viscosities of the individual polymers of the composition, the type and amount of fillers and additives. The melt viscosity may be dependent on the process of preparing the composition, such as screw configuration and design during preparation of the composition as well as processing conditions and these particulars are known to a person skilled in the art and may be determined by routine experiments. In a preferred embodiment the invention relates to a method for preparing a composition having a melt viscosity at most 390 Pa s as determined at 270° C. at a shear rate of 165 1/s. More preferably a melt viscosity of at most 375 Pa s and most preferred a melt viscosity of at most 360 Pas. Preferably, the melt viscosity is at least 150 Pas, as otherwise the mechanical properties may be insufficient.

PBT

Polybutylene terephthalate (IUPAC name Poly(oxy-1,4-butanediyloxycarbonyl-1,4-phenylenecarbonyl); hereafter PBT) is provided in the method according to the invention in an amount of between 40 and 70 wt % with respect to the total weight of the composition, preferably between 50 and 60 wt %. An advantage of providing PBT present in these amounts is that there is an increased dimensional stability and less sensitivity to moisture.

The PBT provided in the method of the present invention has a relative solution viscosity (RSV) of between 1.6 and 2.4 as measured at 25° C. in meta-cresol, according to ISO 1628-5. More preferably, the RSV is between 1.8 and 2.2 more preferably between 1.9 and 2.1. An advantage of this is that there is a good balance between flow behavior and mechanical properties.

PET

Polyethylene terephthalate (IUPAC name Poly(ethyl benzene-1,4-dicarboxylate); hereafter PET) is provided in the method according to the invention in an amount of between 10 and 40 wt %, preferably between 15 and 25 wt % with respect to the total weight of the composition.

The PET provided in the method of the present invention has a relative solution viscosity (RSV) of between 1.1 and 1.5 as measured at 25° C. in dichloro acetic acid, according to ISO 1628-5. More preferably, the RSV is between 1.2 and 1.4.

An advantage of having PET present in these amounts and RSV ranges is that also shows an improved dimensional stability, low shrinkage and good surface appearance Filler The filler provided in the method according to the invention is chosen from the group consisting of glass fibers, talc, mica, wollastonite, glass beads and milled glass and combinations thereof. Fillers may be coated with adhesion promotors. The filler is provided in the method in an amount of between 10 and 30 wt % with respect to the total weight of the composition, preferably between 15 and 25 wt %. An advantage of having the filler present is that it exhibits good reinforcement, as well as dimensional stability.

Preferably the filler provided in the method according to the invention, is talc, as talc has the advantage that as it is readily available and improves stiffness, is water repellent and chemically inert. Preferably, talc is provided having a particle size D-50 of between 2 μm and 30 μm, more preferably between 5 μm and 20 μm and even more preferred between 8 μm and 15 μm. Preferably D-97 is between 8 μm and 90 μm, more preferably between 20 μm and 70 μm, even more preferred between 35 μm and 50 μm. Particle size is measured by Sympatec Rolos (WP90) according to ISO 013320.

Electrically Conductive Additive

The method according to the invention provides an electrically conductive additive chosen from the group consisting of carbon black, carbon fibers, graphite, carbon nanotubes, and graphene and combinations thereof and wherein the electrically conductive additive exhibits a volume resistivity of at most $10^5$ Ohm·cm as measured according to ASTM D257 on an injection molded test sample of 3 mm thickness and a diameter of 50 mm, consisting of 8 wt % of electrically conductive additive and 92 wt % of PBT having a relative solution viscosity of 2.0 in meta cresol, which injection molded test sample was coated with a gold layer on an upper and lower surface. Preferably, the electrically conductive additive exhibits a volume resistivity of at most $10^5$ Ohm·cm when measured on a test sample consisting of 7 wt % of electrically conductive additive and 93 wt % of PBT having a relative solution viscosity of 2.0 in meta cresol, more preferably, the electrically conductive additive exhibits a volume resistivity of at most $10^5$ Ohm.cm when measured on a test sample consisting of 6 wt % of electrically conductive additive and 94 wt % of PBT having a relative solution viscosity of 2.0 in meta cresol, as this allows for employing less electrically conductive additive while still exhibiting sufficient low volume resistivity of the composition.

The test sample is being prepared by preparing the composition consisting of electrically conductive additive and PBT. The composition is prepared on a twin-screw extruder with a barrel temperature of between 240 and 260° C., screw speed of 300 RPM. PBT is dosed to the hopper. The electrically conductive additive is introduced via a side-feeder into the polymer melt. Extruded strands are cooled in water and granulated. The test sample is injection molded from pre-dried (10 hours at 120° C. under vacuum with nitrogen flow) granules on an Engel EVC 110 injection molding machine, with temperature settings of between 240 and 260° C., and mold temperature of 90° C. The electrical resistivity is measured as described in the examples on 3 mm thick disks with 50 mm diameter, which were coated with a gold layer on an upper and lower surface. The electrically conductive additive is provided in the method according to the invention in an amount of between 2 and 10 wt %, preferably between 3 and 9 wt % and even more preferably between 4 and 7 wt %.

Preferably the electrically conductive additive is carbon black, more preferably a carbon black having a oil absorption number (OAN) of at least 200 ml/100 g, preferably at least 300 ml/100 g and even more preferably at least 450 ml/100 g as this allows for lower amounts of the carbon black, such as for example between 2 and 5 wt %. Carbon black having an OAN of at least 300 ml/100 g, is for example Ketjenblack EC600 JD (AkzoNobel), Printex XE2 (Degussa), and Vulcan XCmax (Cabot). Even more preferred is carbon black Ketjenblack EC600 JD, as available from Akzo Nobel, which has an OAN of between 480 to 510 ml/100 g, which is particularly suitable in amounts of between 3 and 5 wt %. The OAN is provided by the absorption of dibutyl phthalate (DBP) method according to ASTM D-2414

Paintability of the composition is satisfactory if the composition exhibits a volume resistivity of at most $10^5$ Ohm.cm, preferably at most $10^4$ Ohm.cm. A person skilled in the art can adjust the amount of electrically conductive additive and/or the electrical resistivity of the electrically conductive additive to achieve the required resistivity of the composition. This gives the advantage that both paintability and adhesion is attained, while the flow behavior and mechanical properties such as tensile strength, strain at break and modulus, remain sufficient. In another preferred embodiment, the method according to the invention results in a composition having a volume resistivity of between $10^2$ to $10^5$ Ohm·cm, more preferably $10^3$ to $10^4$ Ohm·cm, as this greatly enhances the paintability.

In a preferred embodiment, the method for preparing a composition having a melt viscosity of between 160 Pas and 400 Pas as determined according to ISO-11443-2014 at 270° C. and a shear rate of 265 1/s, and a volume resistivity of at most $10^5$ Ohm·cm when measured on an injection molded test sample of 3 mm thickness and a diameter of 50 mm and coated with a gold layer on an upper and lower surface and measured according to ASTM D257, comprising the following steps:

Providing PBT having a relative solution viscosity (RSV) of between 1.6 and 2.4 as measured at 25° C. in meta-cresol according to ISO 1628-5, in an amount of between 40 and 70 wt % with respect to the total weight of the composition;

Providing PET having a relative solution viscosity (RSV) of between 1.1 and 1.5 as measured at 25° C. in dichloro acetic acid according to ISO 1628-5, in an amount of between 10 and 40 wt % with respect to the total weight of the composition;

Providing filler in an amount of between 10 and 30 wt % wherein the filler is talc and wt % being with respect to the total weight of the composition;

Providing an electrically conductive additive in an amount between 2 and 5 wt % with respect to the total weight of the composition, wherein the electrically conductive is carbon black and wherein the electrically conductive additive exhibits a volume resistivity of at most $10^5$ Ohm·cm, as measured according to ASTM D257, measured on an injection molded test sample of 3 mm thickness consisting of 6 wt % of electrically conductive additive and 94 wt % of PBT having a relative solution viscosity of 2.0 in meta cresol, wherein the wt % is with respect to the total weight of the injection molded test sample, which injection molded test sample was coated with a gold layer on an upper and lower surface, and wherein the carbon black has an OAN of at least 450 ml/100 g;

Mixing at least the PBT, PET, filler and electrically conductive additive ingredients at a temperature of between 240 and 260° C. in order to obtain the composition.

Optional Other Ingredients

The method for preparing the composition according to the invention may include further steps for example to provide further ingredients, such as mould release agents, impact modifiers, anti-oxidants, stabilizers, transesterification inhibitors, flame retardants, nucleating agents, plasticizers, colorants, pigments, etc.

Method for Preparing the Composition

The step of mixing at least the PBT, PET, filler and electrically conductive additive in the method according to the invention may be performed by known means, which includes extrusion of all ingredients with for example an extruder or a buss kneader, preferably a twin-screw extruder is used. The person skilled in the art knows that particular production steps may further influence the melt viscosity of the composition. Preferably a twin-screw extruder is used and more preferably PBT and PET are dosed on the feed throat, and even more preferred the filler and electrically conductive additive are dosed in a melt via side-feeder, as this ensures higher throughput and retention of the structure of the electrically conductive additive.

Electrostatic Painting

The method for preparation according to the invention results in a composition which is highly suitable for electrostatic painting. The invention thus also relates to a composition having a melt viscosity of between 160 Pas and 400 Pas, as determined according to ISO-11443-2014 at 270° C. and a shear rate of 265 1/s, and a volume resistivity of at most $10^5$ Ohm.com, when measured according to ASTM D257 on an injection molded test sample of 3 mm thickness and a diameter of 50 mm and coated with a gold layer on an upper and lower surface, comprising:

PBT in an amount of between 40 and 70 wt %;
PET in an amount of between 10 and 40 wt %;
Filler in an amount of between 10 and 30 wt % wherein the filler is chosen from the group consisting of glass fibers, talc, mica, wollastonite, glass beads and milled glass and combinations thereof;
Electrically conductive additive in an amount between 2 and 10 wt % wherein the electrically conductive additive is chosen from the group consisting of carbon black, carbon fibers, graphite, carbon nanotubes, and graphene and combinations thereof;
wherein wt % are given with respect to the total weight of the composition.

Preferably, the filler is talc as elaborated above. Preferably, the electrically conductive additive is carbon black, as elaborated above, more preferably the carbon black has on oil absorption number of at least 300 ml/100 g, as measured according to ASTM D-2414 and wherein the carbon black is present in an amount of between 3 and 5 wt % with respect to the total weight of composition. This composition allows for electrostatic painting while exhibiting good paint adhesion.

The invention also relates to a part comprising the composition as well as painted parts, preferably electrostatically painted parts.

The invention also relates to a method for preparing a painted part, comprising the following steps:

Preparing a part comprising the composition according to the invention or prepared by the method according to the invention;

Grounding or charging the part such that it attracts paint particles;

Coating the part with at least one layer of paint either by spraying the paint in such a manner that it is charged to be attracted to the part or dipping the part into a charged paint reservoir;

Drying and/or curing the paint after application of one or more layers of paint, thereby obtaining a painted part.

A part comprising the composition may be prepared by known means such as injection molding, blow molding and compression molding.

The method for obtaining electrostatic painted parts is known to a person skilled in the art and the exact process suitable for a given paint system and application can be selected by a person skilled in the art.

Coating the part may include applying more than one layer of paints, which paint may differ per layer. Excess of paint may be removed after drying and/or curing by for example rinsing the part.

The method for preparing the composition provides a composition that is particularly suitable for preparing appearance parts, thus parts for which surface appearance is important. These include for example automotive parts, such as a fuel filler cap, also known as tank lid or tank flap, a body panel, a door handle, fenders, fascia, hoods, control panels, etc. These also include non-automotive parts such as interior or exterior refrigerator panels, dishwasher front and/or interior panels; power tool housings such as for example drills and saws; electronic cabinets and housings such as for example computer housings, printer housings, peripheral housings, server housings; exterior and interior panels for vehicles such as for example trains, tractors, lawn mower decks, trucks, snowmobiles, aircraft, ships; decorative interior panels for buildings; furniture such as chairs and tables; as well as telephones and other telephone equipment.

The present invention also relates to electrostatically painted parts, being a part as mentioned above, particularly tank lids.

EXAMPLES

RSV (relative solution viscosity) of PBT was analyzed according to ISO 1628-5. This method describes the determination of the viscosity of PBT in dilute solution in m-cresol using capillary viscometers.

The PBT samples were dissolved during 15 min at 135° C. and diluted in m-cresol; concentration was 1 gram in 100 gram m-cresol at 25° C.

The flow time of the m-cresol and the flow time of the PBT solution were measured at 25° C. The RSV was calculated from these measurements.

RSV of PET was analyzed according to ISO 1628-5. This method describes the determination of the viscosity of PET in dilute solution in DCA (dichloroacetic acid) using capillary viscometers. The PET samples were dissolved at 15 min and 90° C., and diluted in DCA; concentration is 0.5 gram in 100 ml solvent at 25° C.

The flow time of the DCA and the flow time of the PET solution were measured at 25° C.

Materials Used

PBT, polybutylene terephthalate having a relative solution viscosity (RSV) in m-cresol of 2.0, supplier LanXess
PET, polyethylene terephthalate having a relative viscosity (RSV) in DCA of 1.34, supplier DSM
Filler: talc Tital 4591, delivered by Sibelco
Conductive Carbon Black CB-1: Ketjenblack EC-600 JD, delivered by AkzoNobel; OAN of 490 ml/100 gram.
Conductive Carbon Black CB-2: Vulcan XCmax, delivered by Cabot; OAN of 320 ml/100 g.
Transesterification inhibitor: monosodium dihydrogen phosphate, $NaH_2PO_4$, supplier Budenheim.
Mold release agent: Glycolube P, delivered by Lonza
Paint system: water based primer layer (BASF SecuBloc Diamantweiss FU70-0000-002548-900), color layer (BASF Colorbrite MB9149 polar weiss FV58-9149-0025) and top coat (2K-Klarlack iGloss Harter SB81-0400-0025 and iGloss FF81-0400-0025). Top coat was prepared according to manufacturer recommendation using butyl acetate as diluent.

Determination of Volume Resistivity of Electrically Conductive Additive

In order to determine the volume resistivity of the electrically conductive additive, test sample were prepared from a composition consisting of various amounts of electrically conductive additive and the remainder of the composition consisting of PBT having a relative solution viscosity (RSV) in m-cresol of 2.0. The compositions were prepared in a ZSK 25 38D twin-screw extruder from Coperion Werner & Pfleiderer. Barrel temperature was set at 240-260° C., screw speed was 300 RPM. PBT was dosed to the hopper. The carbon black was introduced via a side-feeder into the polymer melt. Extruded strands were cooled in water and granulated. The test samples were injection molded from pre-dried (10 hours at 120° C. under vacuum with nitrogen flow) granules on an Engel EVC 110 injection molding machine, with temperature settings of between 240 and 260° C., and mold temperature of 90° C. Geometry of the test sample was a disk of 3 mm thickness and 50 mm in diameter.

The method of to determine volume resistivity is based on the ASTM D257 standard with the difference that the sample was coated with gold on the upper and lower surface using a standard sputtering technique to ensure a homogeneous electrical field and thus a homogeneous current density. The sample was placed between two 3 mm thick electrodes with a diameter of 50 mm. These two electrodes were connected to one of the measuring devices, depending on the range of the sample resistance: Keithley 617 Electrometer (High range), Fluke 179 Multimeter (Mid range), or HP 3478A Multimeter (Low Range).

The volume resistivity was calculated using the geometry of the sample. The measurements were performed at 23° C. and 50% RH. Volume resistivity of PBT materials based on CB-1 and CB-2, respectively is shown in Table 1.

TABLE 1

| CB-1 [%] | 4 | 5 | | |
|---|---|---|---|---|
| CB-2 [%] | | | 8 | 10 |
| Volume res. [ohm · cm] | $9 \cdot 10^9$ | $1 \cdot 10^3$ | $7 \cdot 10^{10}$ | $5 \cdot 10^3$ |

Method for Preparation of the Composition

The method for preparation of the compositions were carried out on a ZSK 25 38D twin-screw extruder from Coperion Werner and Pfleiderer. Barrel temperature was set at 240 to 260° C., screw speed was 300 RPM and yield was 18-24 kg/hour. Components such as PBT, PET, transesterification inhibitor, and mould release agent were dosed to the hopper as a pre-blend. Talc and carbon black were introduced via a side-feeder into the polymer melt. Extruded strands were cooled in water and granulated.

Melt Viscosity

Melt viscosity of the composition was measured with a capillary rheometer as described in ISO-11443-2014. As melt viscosity determination is known to be sensitive to experimental conditions, the following protocol consistent with ISO-11443-2014 A2-type test (capillary die with specified volume flow rate) was used. Experiments were performed with a Göttfert Rheograph 120 with oven diameter 12 mm, and a capillary of length 30 mm, diameter 1 mm, a ratio of length to diameter of 30/1 and entrance angle 180° (flat). The pressure transducer was a CAN-bus with maximum 2000 bar. The filling time was 45 to 60 seconds, the melting time 300 s, and the piston speed changed from low to high speed in the following steps: 0.02, 0.05, 0.1, 0.2, 0.5, 1, 2, 5 and 10 mm/s. The measuring temperature was 270° C. Data point, take over: 1% tolerance, comparison time 10 seconds. The volume flow rate, Q, is calculated to be equal to the piston velocity in mm/s multiplied by the area of the piston in square mm. The shear rate is calculated according to ISO-11443-2014 section 8.5 equation 12. No Bagley correction is applied and the shear stress is calculated according to ISO-11443-2014 section 8.3.2 equation 5. The ratio of the shear stress and shear rate as previously defined is the melt viscosity according to ISO-11443-2014 section 3.10. The results are reported as melt viscosity at a piston velocity of 0.2 mm/s, and the extrapolated melt viscosity at a shear rate of 265 1/s. The compositions all had a moisture content below 0.01%.

Preparation of Test Samples by Injection Moulding to Measure Mechanical Properties.

Various test samples were injection moulded from pre-dried (10 hours at 120° C. under vacuum with nitrogen flow) granules on an Engel EVC 110 injection moulding machine, with temperature settings 245-265° C., and mould temperature of 90° C.

Properties Injection Moulded Test Samples

The tensile tests were carried out at 23° C. according to ISO 527 type 1A method. Tensile testing speed 5 mm/min was used.

The Charpy impact strength was evaluated at 23° C. according to ISO 179/1eU method.

The method of resistivity measurements were based on the ASTM D257 standard with the difference that samples having the geometry of a disk of 3 mm thickness and 50 mm diameter were coated with gold on the upper and lower surface using a standard sputtering technique to ensure a homogeneous electrical field and thus a homogeneous current density. The sample was placed between two 3 mm thick electrodes with a diameter of 50 mm. These two electrodes were connected to one of the measuring devices, depending on the range of the sample resistance: Keithley 617 Electrometer (High range), Fluke 179 Multimeter (Mid range), or HP 3478A Multimeter (Low Range).

The volume resistivity was calculated using the geometry of the sample, which was a disk of 3 mm thickness and 50 mm in diameter. The measurements were performed at 23° C. and 50% RH.

Parts were spray painted with a 3 layer paint system consisting of a primer layer, a color layer, and a clear coat. Paint can be applied via electrostatic spray application (ESTA-Bell application) or pneumatic spray application. Each layer was dried and cured according to the manufacturer guidelines for that paint system.

Paint adhesion was assessed on painted parts after the paint system as fully cured. Two crossed scratches were made such that the scratch was fully through the paint coating and into the body of the part. Then pressurized water was run along the scratches. This water jet testing was done according to ISO 16925:2014, method. Paint adhesion was judged visually with little or no paint removed being rated as good and larger areas of paint removal judged as bad. Good and bad ranking corresponds to ISO 162925:2014 ratings of 0-1 and 2-5, respectively.

TABLE 2

|  | Comp-A | Comp-B | Example-1 | Comp-C | Comp-D |
|---|---|---|---|---|---|
| CB-1 [%] | 0 | 3 | 4 | | |
| CB-2 [%] | | | | 6 | 8 |
| Volume res. [ohm · cm] | >$10^{12}$ | 7 · $10^9$ | 4 · $10^3$ | 1 · $10^{10}$ | 2 · $10^3$ |
| Mechanical properties | | | | | |
| E-modulus [MPa] | 5210 | 5710 | 5800 | 6045 | 6510 |
| Stress at break [MPa] | 59 | 56 | 55 | 58 | 58 |
| Strain at break [%] | 2.1 | 1.4 | 1.3 | 1.4 | 1.2 |
| Charpy [kJ/m2] | 33 | 24 | 23 | 27 | 23 |
| Capillary flow at 270° C. | | | | | |
| Shear rate [1/s] | 264 | 263 | 266 | 265 | 267 |
| Melt viscosity [Pa · s] | 162 | 241 | 248 | 302 | 418 |
| Electrostatic painting | | | | | |
| Paintability | bad | bad | good | bad | good |
| Paint adhesion | good | good | good | bad | bad |

Comparative Experiment A

A composition was prepared and tested comprising 20 wt. % PET, 20 wt. % talc, 0.3 wt. % mould release agent, and 0.1 wt. % transesterification inhibitor, the balance being PBT. The material properties are shown in table 2. The paintablity is rather poor due to the high volume resistivity of the material.

Comparative Experiment B

As in Comparative example A, however 3% of the electrically conductive component CB-1 was used, the balance being PBT. The material is more brittle, e.g lower strain at break and Charpy impact strength when addition of the Carbon black. The paintability appears to be not sufficient due to the high volume resistance.

Example 1

As in Comparative example B, however 4% of the electrically conductive component CB-1 was used, the balance being PBT. The paintability was good due to improved volume resistivity. Moreover, the paint adhesion of the laquer system and the conductive PBT substrate was good.

Comparative Experiment C

As in Comparative example B, however 6% of the electrically conductive component CB-2 was used, the balance being PBT. The paintability appears to be not sufficient due to the high volume resistivity. In addition, the higher melt viscosity of the composition resulted in poor paint adhesion properties.

Comparative Experiment D

As in Comparative example C, however 8% of the electrically conductive component CB-2 was used, the balance being PBT. The paintability improved with decreasing volume resistivity, but resulting paint adhesion was rather poor as the melt viscosity of the composition was above 400 Pas.

The invention claimed is:

1. A composition comprising, with respect to total weight of the composition:
   (i) polybutylene terephthalate (PBT) in an amount between 40 and 70 wt %;
   (ii) polyethylene terephthalate (PET) in an amount between 10 and 40 wt %;
   (iii) a filler in an amount of between 10 and 30 wt %, wherein the filler is selected from the group consisting of glass fibers, talc, mica, wollastonite, glass beads and milled glass and combinations thereof; and
   (iv) an electrically conductive additive in an amount between 2 and 10 wt %, wherein the electrically conductive additive is selected from the group consisting of carbon black, carbon fibers, graphite, carbon nanotubes, and graphene and combinations thereof; wherein
   the composition has a melt viscosity of between 160 Pas and 400 Pas as determined according to ISO-11443-2014 at 270° C. and a shear rate of 265 1/s, and a volume resistivity of at most $10^5$ Ohm.com when measured according to ASTM D257 on an injection molded test sample of 3 mm thickness and a diameter of 50 mm and coated with a gold layer on an upper and lower surface.

2. The composition according to claim 1, wherein the filler is talc.

3. The composition according to claim 2, wherein the talc has a particle size D-50 of between 5 μm and 20 μm and a D-97 of between 20 μm and 70 μm.

4. The composition according to claim 1, wherein the electrically conductive additive is carbon black.

5. The composition according to claim 4, wherein the carbon black has an oil absorption number of at least 300 ml/100 g, as measured according to ASTM D-2414, and wherein the carbon black is present in an amount of between 3 and 5 wt % with respect to the total weight of the composition.

6. A part comprising the composition according to claim 1.

7. A painted part comprising the part according to claim 6, and a coating layer of paint on the part.

* * * * *